(12) United States Patent
Huang

(10) Patent No.: US 7,610,443 B2
(45) Date of Patent: Oct. 27, 2009

(54) METHOD AND SYSTEM FOR ACCESSING AUDIOVISUAL DATA IN A COMPUTER

(75) Inventor: Chun-Chang Huang, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 355 days.

(21) Appl. No.: 11/252,832

(22) Filed: Oct. 19, 2005

(65) Prior Publication Data

US 2006/0200625 A1    Sep. 7, 2006

(30) Foreign Application Priority Data

Mar. 1, 2005    (TW) .............................. 94106064 A

(51) Int. Cl.
*G06F 12/00*    (2006.01)

(52) U.S. Cl. .................. 711/112; 711/114; 711/154; 711/165; 703/23; 703/24; 703/25; 710/1; 710/5; 710/36; 360/97.01; 360/98.03; 714/29

(58) Field of Classification Search ............... None
See application file for complete search history.

(56) References Cited

U.S. PATENT DOCUMENTS

| | | | | |
|---|---|---|---|---|
| 5,581,740 A | * | 12/1996 | Jones | ................. 703/25 |
| 2002/0038406 A1 | * | 3/2002 | Shirai et al. | ............ 711/137 |
| 2003/0142554 A1 | * | 7/2003 | Green et al. | ........ 365/189.01 |

* cited by examiner

*Primary Examiner*—Sanjiv Shah
*Assistant Examiner*—Midys Rojas
(74) *Attorney, Agent, or Firm*—Bacon & Thomas, PLLC

(57) ABSTRACT

A method and system for accessing audiovisual data in a computer, which has a hard disk, a hard disk controller and a device driver. The hard disk is divided into a partition region and a non-partition region. The partition region has an audiovisual table to record a location of the audiovisual data stored in the non-partition region. The non-partition region is emulated as an emulated compact disk drive. When the device driver determines to access the emulated compact disk drive, it performs a converting procedure to convert an access instruction to the compact disk drive into an access instruction to the non-partition region, and sets a command register of the hard disk controller in accordance with the instruction converted and the audiovisual table, thereby accessing the non-partition region.

19 Claims, 7 Drawing Sheets

| FIELD NAME | SIZE (BYTE) | DESCRIPTION |
|---|---|---|
| DN | 16 | Disk Name |
| MCSBA | 4 | Main Channel Start Block Address |
| NMCB | 4 | Number of Main Channel Blocks |
| PSCSBA | 4 | P-Sub Channel Start Block Address |
| NPSCB | 4 | Number of P-Sub Channel Blocks |
| QSCSBA | 4 | Q-Sub Channel Start Block Address |
| NQSCB | 4 | Number of Q-Sub Channel Blocks |
| RSCSBA | 4 | R-Sub Channel Start Block Address |
| NRSCB | 4 | Number of R-Sub Channel Blocks |
| SSCSBA | 4 | S-Sub Channel Start Block Address |
| NSSCB | 4 | Number of S-Sub Channel Blocks |
| TSCSBA | 4 | T-Sub Channel Start Block Address |
| NTSCB | 4 | Number of T-Sub Channel Blocks |
| USCSBA | 4 | U-Sub Channel Start Block Address |
| NUSCB | 4 | Number of U-Sub Channel Blocks |
| VSCSBA | 4 | V-Sub Channel Start Block Address |
| NVSCB | 4 | Number of V-Sub Channel Blocks |
| WSCSBA | 4 | W-Sub Channel Start Block Address |
| NWSCB | 4 | Number of W-Sub Channel Blocks |
| MCSBA | 4 | Main Channel Start Block Address |
| NMCB | 4 | Number of Main Channel Blocks) |
| ... | ... | ... |
| ... | ... | ... |

FIG. 4

METHOD AND SYSTEM FOR ACCESSING AUDIOVISUAL DATA IN A COMPUTER

BACKGROUND OF THE INVENTION

1. Field of the Invention

The invention relates to the technical field of audiovisual data access and, more particularly, to a method and system for accessing audiovisual data in a computer.

2. Description of Related Art

FIG. 1 shows a schematic diagram of a typical configuration of a personal computer system. As shown, the system includes a processor 110, a north bridge chip 120, a system memory 130, a south bridge chip 140, a hard disk controller 141 and a hard disk 150. The hard disk 150 has a partition region and stores an operating system. The processor 110 executes the operating system through the north bridge chip 120 and stores corresponding data in the system memory 130. As shown in FIG. 2, when an application program 210 is to access a file stored in the hard disk, the operating system 220 sends corresponding information to a device driver 230 in accordance with a file system. The device driver 230 sets the registers of the hard disk controller 141 in accordance with an instruction sent by the operating system, and the hardware of the hard disk controller 141 executes corresponding access instructions to the hard disk 150, thereby reading or writing data from or to the hard disk 150.

A typical file system has a sector size of 4K bytes, which can conveniently access numerous small-size files and avoid wasting the sectors of the hard disk 150. However, a typical audiovisual file has a very large size and is read and written consecutively, and the typical file system is not good at managing and protecting such a data. In addition, the file system and the audiovisual file are stored in a same partition region of the hard disk 150. At this point, when the file system is damaged, it can cause the audiovisual file to become incapable of being read.

Therefore, it is desirable to provide an improved method and system to mitigate and/or obviate the aforementioned problems.

SUMMARY OF THE INVENTION

The object of the invention is to provide a method and system for accessing audiovisual data in a computer, which can avoid the problem that a typical file system cannot efficiently manage audiovisual data, and can also obtain the audiovisual data protection to thus increase system stability.

In accordance with one aspect of the invention, there is provided a method for accessing audiovisual data in a computer. The computer includes a hard disk divided into a partition region and a non-partition region. The partition region has an audiovisual table to record a location of the audiovisual data stored in the non-partition region. The method includes the steps: a load step, which loads the audiovisual table and emulates the non-partition region as an emulated compact disk drive; an access determining step, which determines if the computer accesses the emulated compact disk drive; a converting step, which performs a converting procedure to convert an access instruction to a compact disk drive into an access instruction to the non-partition region when the access determining step decides that the emulated compact disk drive is accessed; an access step, which accesses the non-partition region in accordance with the access instruction converted and the audiovisual table.

In accordance with another aspect of the present invention, there is provided a system for accessing audiovisual data in a computer. The system includes a hard disk, a hard disk controller and a device driver. The hard disk is divided into a partition region and a non-partition region. The partition region has an audiovisual table to record a location of the audiovisual data stored in the non-partition region. The non-partition region is emulated as an emulated compact disk drive. The hard disk controller has at least one command register to execute a hard disk access instruction. The device driver sets the at least one command register of the hard disk controller in accordance with an access instruction sent by the computer, such that the hard disk controller executes the hard disk access instruction. When the device driver decides that an access to the emulated compact disk drive is to be performed, a converting procedure is performed to convert an access instruction to a compact disk drive into an access instruction to the non-partition region. The device driver sets the at least one command register of the hard disk controller in accordance with the access instruction converted and the audiovisual table, thereby accessing the non-partition region.

Other objects, advantages, and novel features of the invention will become more apparent from the following detailed description when taken in conjunction with the accompanying drawings.

BRIEF DESCRIPTION OF THE DRAWINGS

FIG. 4 is a schematic diagram of a format of an audiovisual table;

DETAILED DESCRIPTION OF THE PREFERRED EMBODIMENT

Figure 1:
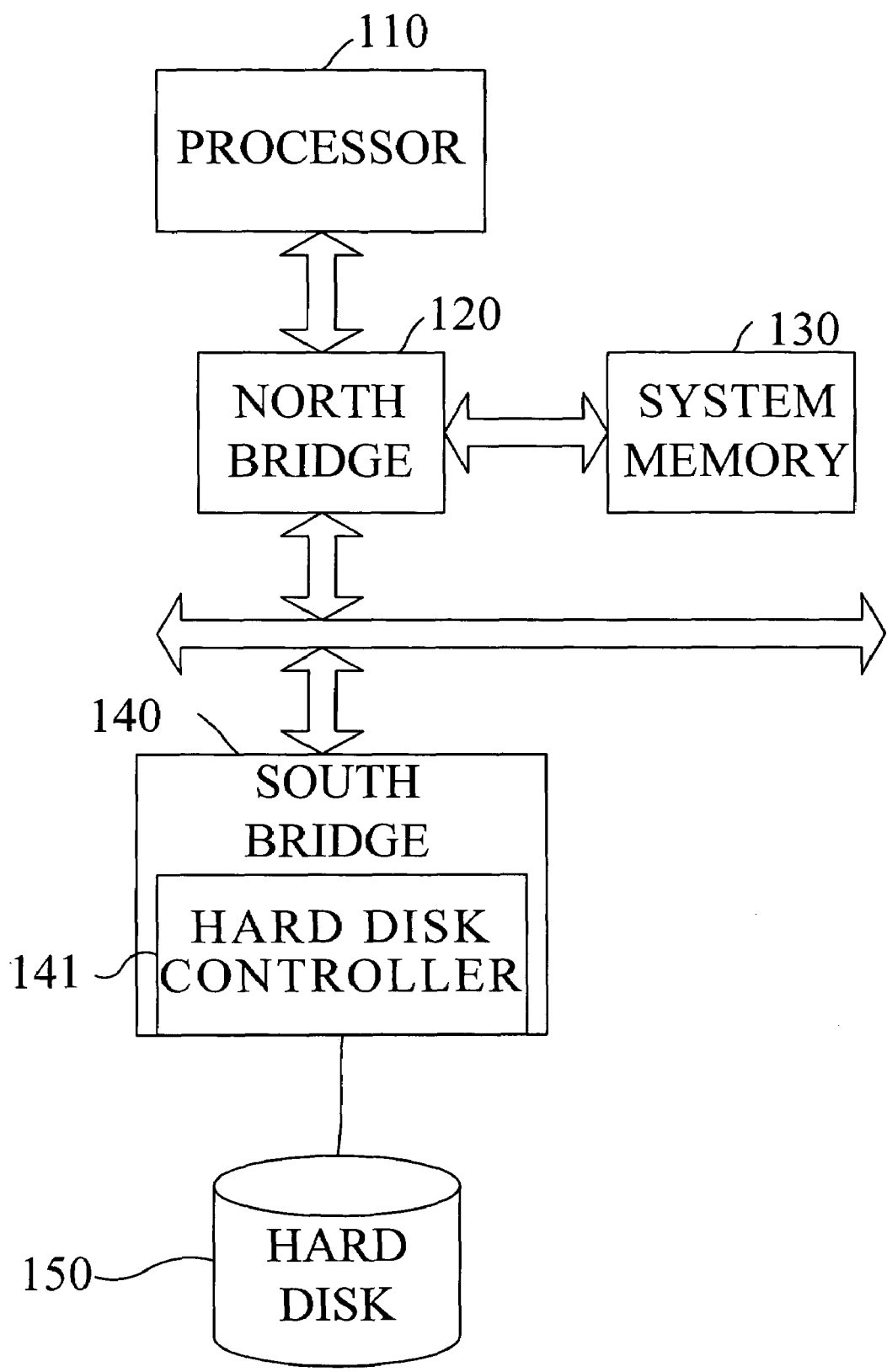
FIG. 1 shows a schematic diagram of a typical configuration of a personal computer system.
Figure 2:
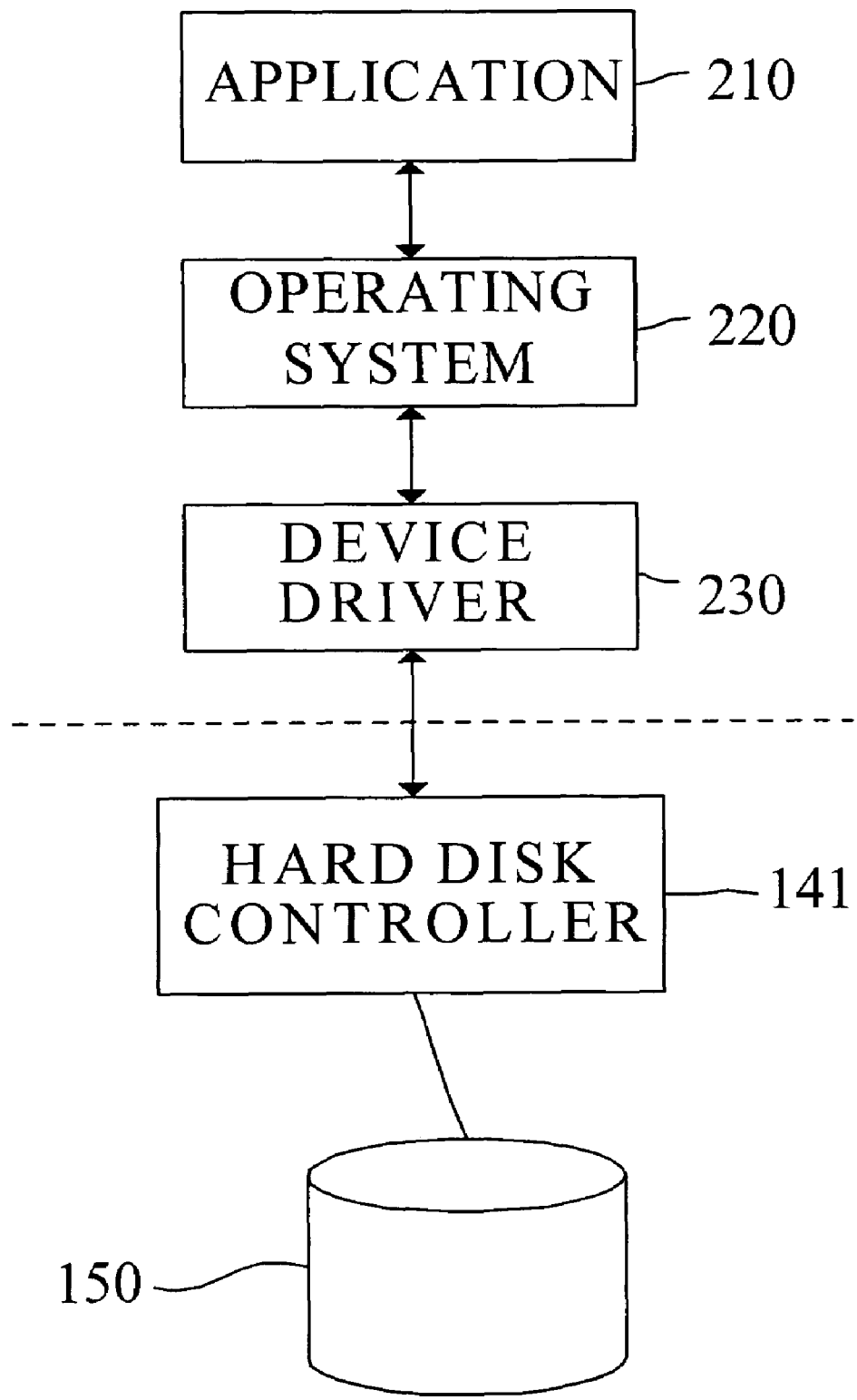
FIG. 2 is a schematic diagram of a typical operating system and a device driver.
Figure 3:
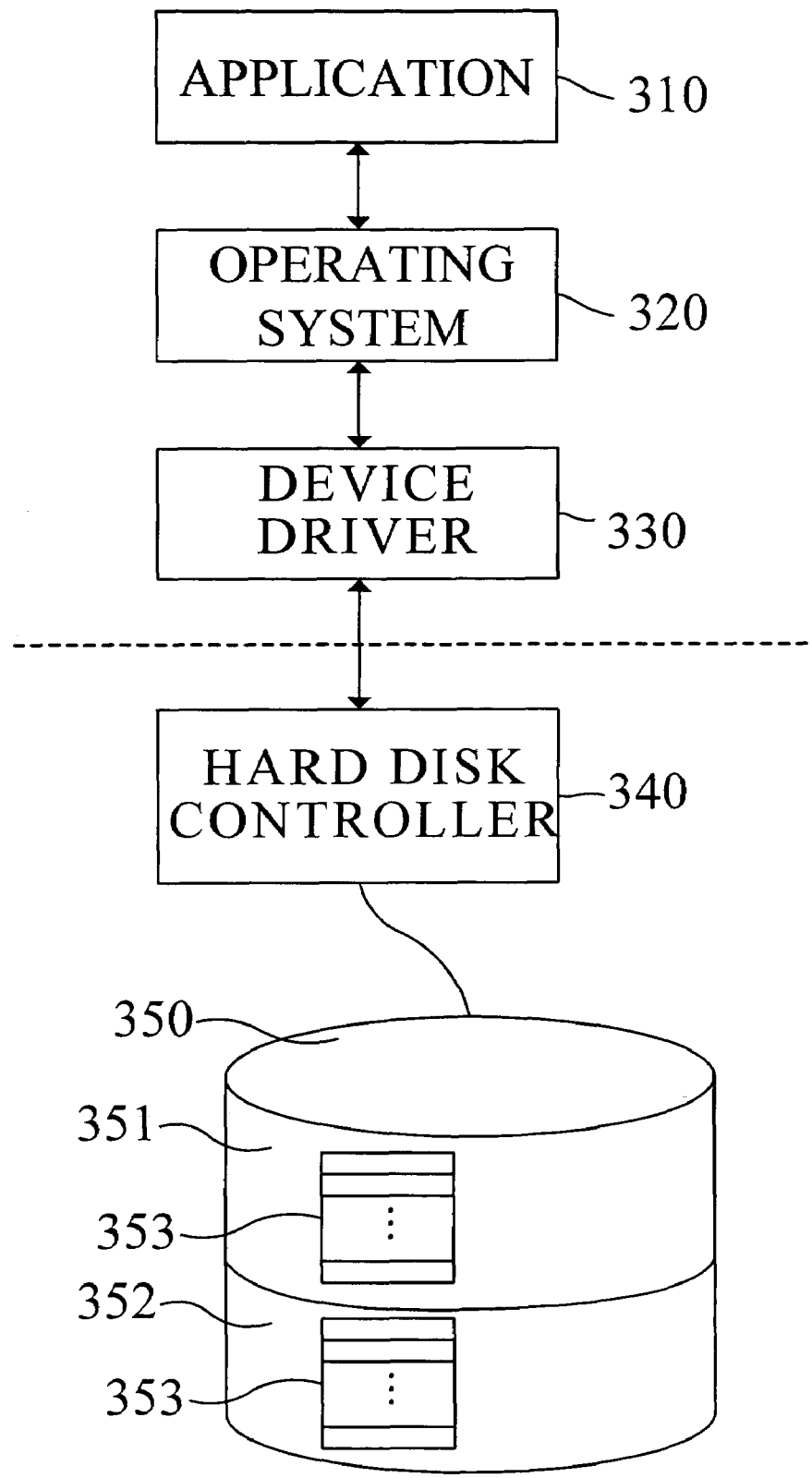
FIG. 3 is a schematic diagram of a system for accessing audiovisual data in a computer in accordance with the invention.

FIG. 3 is a schematic diagram of a system for accessing audiovisual data in a computer in accordance with the invention. The system includes an application program 310, an operating system 320, a device driver 330, a hard disk controller 340 and a hard disk 350. The operating system 320 can be a Window XP™, 2000 or 98, a Linux™ with X window, or an embedded operating system such as VxWork™, ucLinux™ or WinCE™.

The hard disk 350 is divided into a partition region 351 and a non-partition region 352. The partition region 351 has an audiovisual table 353 to record a location of the audiovisual data stored in the non-partition region 352. The non-partition region 352 is emulated as a rewritable compact disk (CD-RW) drive. Due to the increasing capacity of hard disks, in addition to the CD-RW drive, the non-partition region 352 can be emulated as a rewritable digital versatile disk (DVD-RW), and even a plurality of DVD-RW drives.

The hard disk controller 340 has at least one command register to execute a hard disk access instruction. The device driver 330 sets the at least one command register of the hard disk controller 340 in accordance with an access instruction sent by the operating system 320, and the hard disk controller 340 accordingly executes a corresponding access instruction, i.e., the hard disk access instruction.

After the operating system 320 has started, an application program 310 loads the audiovisual table 353 and emulates the non-partition region 352 as a CD-RW drive. If the operating system 320 is an embedded operating system, the audiovisual table 353 is loaded by the device driver 330. In this case, the device driver 330 can be a user mode device driver.

FIG. 4 is a schematic diagram of a format of an audiovisual table; wherein the tracks of a CD-RW drive are emulated using every nine fields that indicate one main channel and eight sub-channels (P, Q, R, S, T, U, V, W). Accordingly, pluralities of the nine fields can be used to emulate the non-partition region 352 as multiple DVD-RW drives. When the most significant bit (MSB) of the main channel block number NMCB is '1', it indicates that no more tracks of another compact disk drive emulated are recorded.

Because the audiovisual data has a very large size, typically Megabyte or even Gigabyte, the device driver 330 can set a block size to 1M, 2M, . . . , $2^{n-1}$M bytes. Namely, the device driver 330 accesses the non-partition region 352 in a unit of the block size set (new block size), other than the prior 4K bytes. Thus, the access speed to the non-partition region 352 can be accelerated, and also the fragments of the non-partition region 352 are reduced.

When a user uses the application program 310 to access a compact disk drive, the operating system 320 sends an Advanced Technology Attachment Packet Interface (ATAPI) access instruction to the device driver 330. The device driver 330 determines if the access to an emulated compact disk drive, which is emulated by the non-partition region 352, has been performed. If the access to the emulated compact disk drive has been performed, the device driver 330 performs a converting procedure to convert the ATAPI access instruction into an Advanced Technology Attachment (ATA) access instruction. The device driver 330 sets the at least one command register of the hard disk controller 340 in accordance with the converted access instruction (the ATA access instruction) and the audiovisual table 353, thereby accessing the non-partition region 352.

If the access is not performed on the emulated compact disk drive, the device driver 330 sets the at least one command register of the hard disk controller 340 in accordance with the ATAPI access instruction, thereby accessing a physical compact disk drive.

Figure 5:
FIG. 5 is a schematic diagram of converting an ATAPI READ (12) command into an ATA READ DMA command in accordance with the invention.

FIG. 5 is a schematic diagram of converting an ATAPI READ (12) command into an ATA READ DMA command in accordance with the invention. The ATAPI READ (12) command reads 0×8000 (=32K) bytes starting with a logical block address (LBA) '0×00800000'. The device driver 330 changes the ATAPI READ (12) command into the ATA READ DMA command in accordance with the data stored in the audiovisual table 353, wherein a SECTOR COUNT field is set to '0×40h' to indicate to read 64 (=0×40h) sectors. In addition, the device driver 330 computes the LBA corresponding to the non-partition region 352. The LBA corresponding to the non-partition region 352 is represented by an equation MCSBA*(SPB)+0×00800000, where SPB indicates sector number per block (sectors per block). If the non-partition region 352 is set to 1M bytes per block, the SPB is '0×800 (=1024*1024/512)'. The device driver 330 sets the at least one command register of the hard disk controller 340 in accordance with the corresponding LBA and the physical sector and head number of the hard disk 350, thereby accessing the non-partition region 352.

If the non-partition region 352 is set to 1M bytes per block, the device driver 330 sends 32K byte data received to the operating system 320 and subsequently reads the next (1M-32K) byte data. Namely, the device driver 330 accesses the non-partition region 352 by reading ahead. Since the audiovisual file is large and read consecutively, such an access way can accelerate the reading speed of the non-partition region 352.

Figure 6:
FIG. 6 is a schematic diagram of converting an ATAPI WRITE (12) command into an ATA WRITE DMA command in accordance with the invention.

FIG. 6 is a schematic diagram of converting an ATAPI WRITE (12) command into an ATA WRITE DMA command in accordance with the invention. The device driver 330 accesses the non-partition region by writing back, i.e., the device driver 330 requests the operating system for a memory region in order to temporarily store data in the memory region before the data is written to the non-partition region 352. When the device driver 330 determines that data to be written to a same LBA exceeds 1M bytes, it sends the data stored in the memory region to the hard disk controller 340 in order to write the data to the hard disk 350. Since the audiovisual file is large and written consecutively, such an access way can speed writing in the non-partition region 352 and also reduce the fragments of the non-partition region 352.

When the device driver 330 uses write behind, device driver 330 implements a flush function. Namely, when the application program 310 is closed or before the operation system is shut down, it is necessary to write the data stored in the memory region to the non-partition region 352 to avoid the data becoming lost.

The device driver 330 can alternatively use the write through, i.e., in the situation where the device driver 330 directly sends 32K byte data received to the hard disk controller 340 in order to write the data to the hard disk 350.

The audiovisual table 353 can be copied to a pre-determined location of the non-partition region 352. For example, the audiovisual table 353 is stored in the last eight sectors of the non-partition region 352. When an incorrect operation by the user or a virus damages the operating system 320, only re-installing the operating system 320 and the device driver 330 in the partition region 351 are required. Thus, the device driver 330 can read the audiovisual table 353 from the pre-determined location of the non-partition region 352 and accordingly accesses the corresponding audiovisual data in the non-partition region 352.

Figure 7:
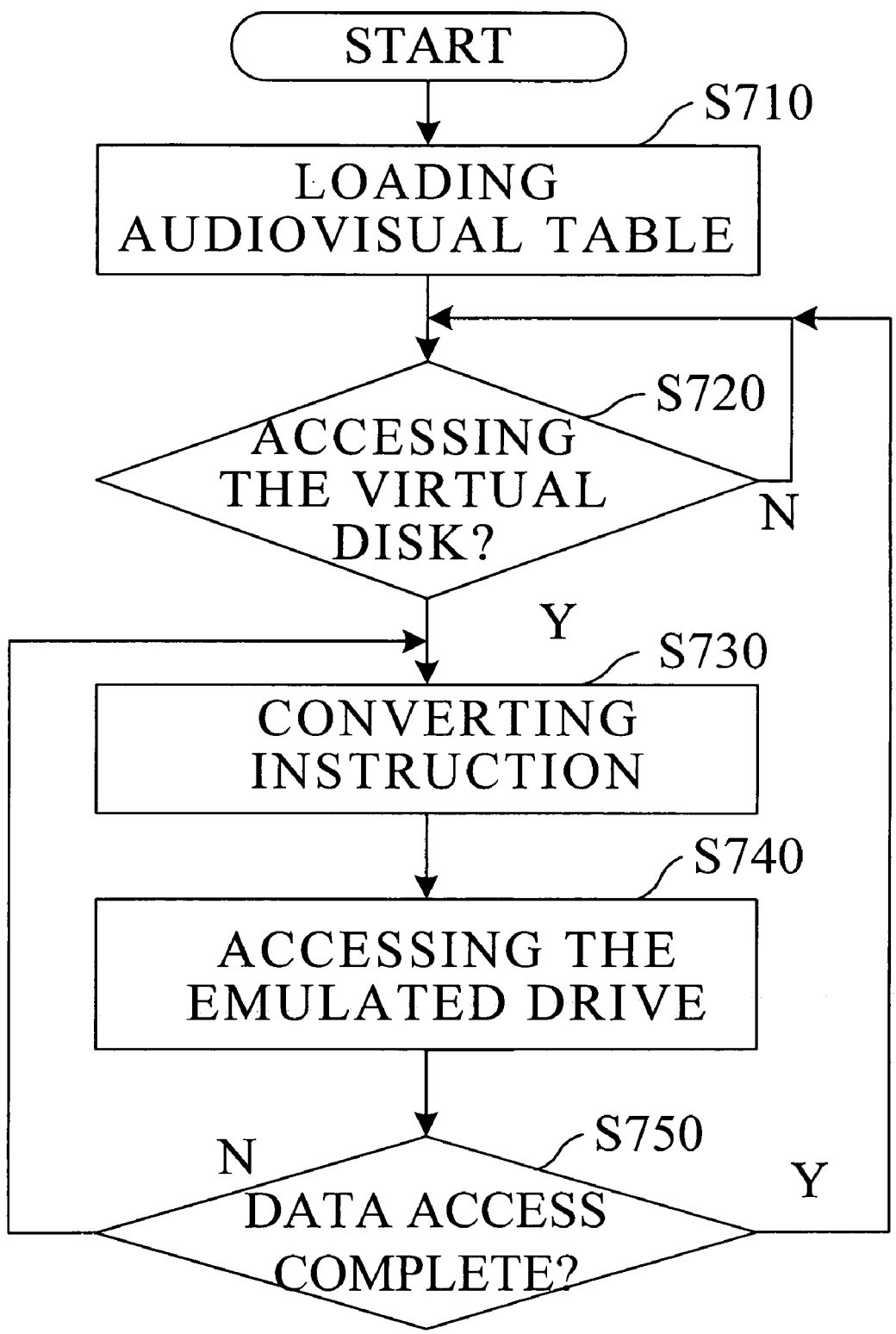
FIG. 7 is a flowchart of a method for accessing audiovisual data in a computer in accordance with the invention.

FIG. 7 is a flowchart of a method for accessing audiovisual data in a computer in accordance with the invention. In step S710, the application program 310 or the device driver 330 loads the audiovisual table 353 and emulates the non-partition region 352 as an emulated CD-RW drive or an emulated DVD-RW drive. In step S720, the device driver 330 determines if an access to the emulated CD-RW drive has been performed; if yes, it performs a converting procedure (step S730) to convert an ATAPI access instruction into an ATA access instruction.

If an access to the emulated CD-RW drive has not been performed, the device driver 330 sets the at least one command register of the hard disk controller 340 in accordance with the ATAPI access instruction, thereby accessing a physical compact disk drive, and go to step S720 for execution.

In Step S740, the device driver 330 sets the at least one command register of the hard disk controller 340 in accordance with the ATA access instruction and the audiovisual table 353, thereby accessing the non-partition region 352. In Step S750, the device driver 330 determines if the data access to the non-partition region 352 is complete; if yes, step S720 is executed; and if not, step S730 is executed for a subsequent data access.

In view of the foregoing, it is known that the inventive device driver 330 performs a read ahead and write behind access on the non-partition region 352 in accordance with the size of an audiovisual data, such that it can speed the access to the non-partition region 352 and also reduce the fragments. In addition, because the audiovisual data is accessed through the audiovisual table 353, it avoids the damage from a user at incorrect operation or a virus. In this case, even if the operating system in the partition region 351 is damaged, the device driver 330 can read the audiovisual table 353 in the non-partition region 352 and access the corresponding audiovisual data, which can easily protect audiovisual data under the windows operating system that are easily affected by viruses.

Although the present invention has been explained in relation to its preferred embodiment, it is to be understood that many other possible modifications and variations can be made without departing from the spirit and scope of the invention as hereinafter claimed.

What is claimed is:

1. A method for accessing audiovisual data in a computer, the computer including a hard disk divided into a partition region and a non-partition region, the partition region having an audiovisual table to record a location of the audiovisual data stored in the non-partition region and the audiovisual table being copied to a pre-determined location of the non-partition region, the method comprising the steps:
   - a load step, which loads the audiovisual table and emulates the non-partition region as an emulated rewritable compact disk (CD-RW) drive for storing the audiovisual data;
   - an access determining step, which determines if the computer accesses the emulated compact disk drive;
   - a converting step, which sets a block size of the non-partition region to $2^{n-1}$ mega bytes and performs a converting procedure to convert an access instruction to a compact disk drive into an access instruction to the non-partition region when the access determining step decides that the computer accesses the emulated rewritable compact disk drive, wherein n is a positive integer; and
   - an access step, which accesses the non-partition region in accordance with the access instruction converted and the audiovisual table.

2. The method as claimed in claim 1, wherein the access determining step is repeated when determining that the computer does not access the emulated compact disk drive.

3. The method as claimed in claim 1, wherein the load step emulates the non-partition region as a rewritable digital versatile disk (DVD-RW) drive.

4. The method as claimed in claim 1, wherein the access instruction to the compact disk drive is an Advanced Technology Attachment Packet Interface (ATAPI) access instruction.

5. The method as claimed in claim 1, wherein the access instruction to the non-partition region is an Advanced Technology Attachment (ATA) access instruction.

6. The method as claimed in claim 1, wherein the access step reads the non-partition region by reading ahead.

7. The method as claimed in claim 1, wherein the access step writes the non-partition region by writing behind.

8. The method as claimed in claim 1, wherein the load step emulates the non-partition region as a plurality of CD-RW drives.

9. The method as claimed in claim 1, wherein the load step emulates the non-partition region as a plurality of DVD-RW drives.

10. A system for accessing audiovisual data in a computer, comprising:
    - a hard disk, which is divided into a partition region and a non-partition region, wherein the partition region has an audiovisual table to record a location of the audiovisual data stored in the non-partition region and the audiovisual table is copied to a pre-determined location of the non-partition region, and the non-partition region is emulated as an emulated compact disk drive (CD-RW) drive for storing the audiovisual data;
    - a hard disk controller, which has at least one command register to execute a hard disk access instruction; and
    - a device driver, which sets a block size of the non-partition region to $2^{n-1}$ mega bytes and sets the at least one command register of the hard disk controller in accordance with an access instruction sent by the computer, such that the hard disk controller executes the hard disk access instruction, wherein n is a positive integer; and
    - wherein the device driver performs a converting procedure to convert an access instruction to a compact disk drive into an access instruction to the non-partition region when determining that an access to the emulated rewritable compact disk drive is to be performed, and sets the at least one command register of the hard disk controller in accordance with the access instruction to the non-partition region and the audiovisual table, thereby accessing the non-partition region.

11. The system as claimed in claim 10, wherein the non-partition region is emulated as a plurality of CD-RW drives.

12. The system as claimed in claim 10, wherein the non-partition region is emulated as a rewritable digital versatile disk (DVD-RW) drive.

13. The system as claimed in claim 10, wherein the access instruction to the compact disk drive is an Advanced Technology Attachment Packet Interface (ATAPI) access instruction.

14. The system as claimed in claim 10, wherein the access instruction to the non-partition region is an Advanced Technology Attachment (ATA) access instruction.

15. The system as claimed in claim 10, wherein the device driver uses read ahead to read the non-partition region.

16. The system as claimed in claim 10, wherein the device driver uses write behind to write the non-partition region.

17. The system as claimed in claim 10, wherein a copy of the audiovisual table is stored in a pre-determined location of the non-partition region.

18. The system as claimed in claim 17, wherein the pre-determined location is located in the last eight sectors of the non-partition region.

19. The system as claimed in claim 10, wherein the non-partition region is emulated as a plurality of DVD-RW drives.

* * * * *